Jan. 17, 1933.   L. BALGA   1,894,844
AIRCRAFT PROPULSION MECHANISM
Filed Nov. 27, 1931   3 Sheets-Sheet 1
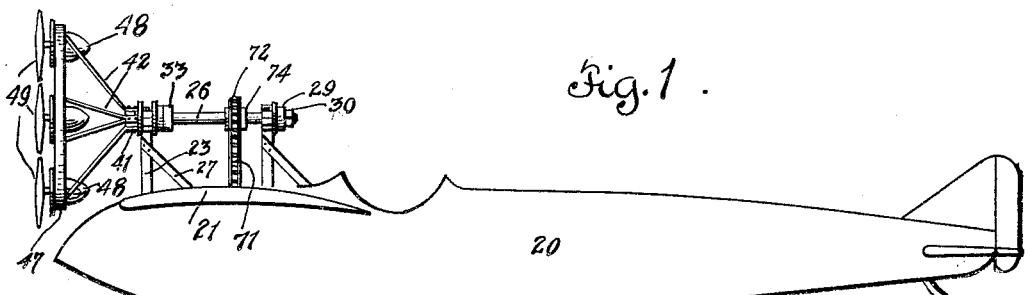
Fig. 1.
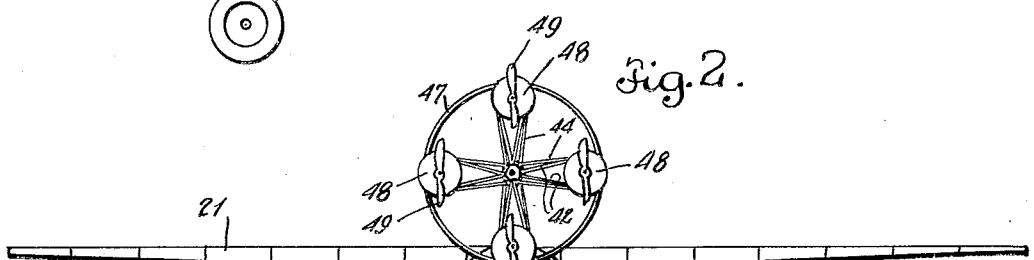
Fig. 2.
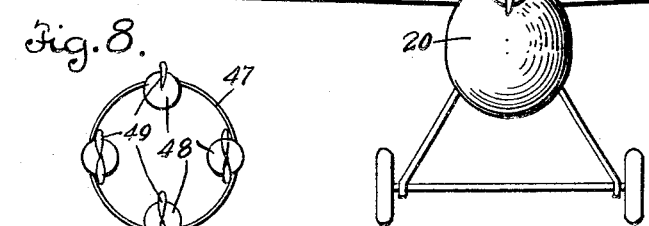
Fig. 8.
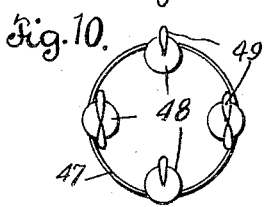
Fig. 9.
Fig. 10.
Fig. 11.
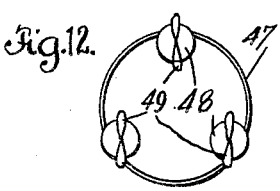
Fig. 12.
Fig. 13.
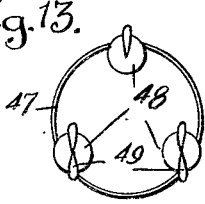
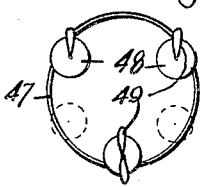
Fig. 14.
Fig. 15.
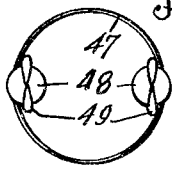
Fig. 16.
Inventor
Louis Balga.
By Bryant & Lowry
Attorneys Jan. 17, 1933.   L. BALGA   1,894,844
AIRCRAFT PROPULSION MECHANISM
Filed Nov. 27, 1931   3 Sheets-Sheet 2
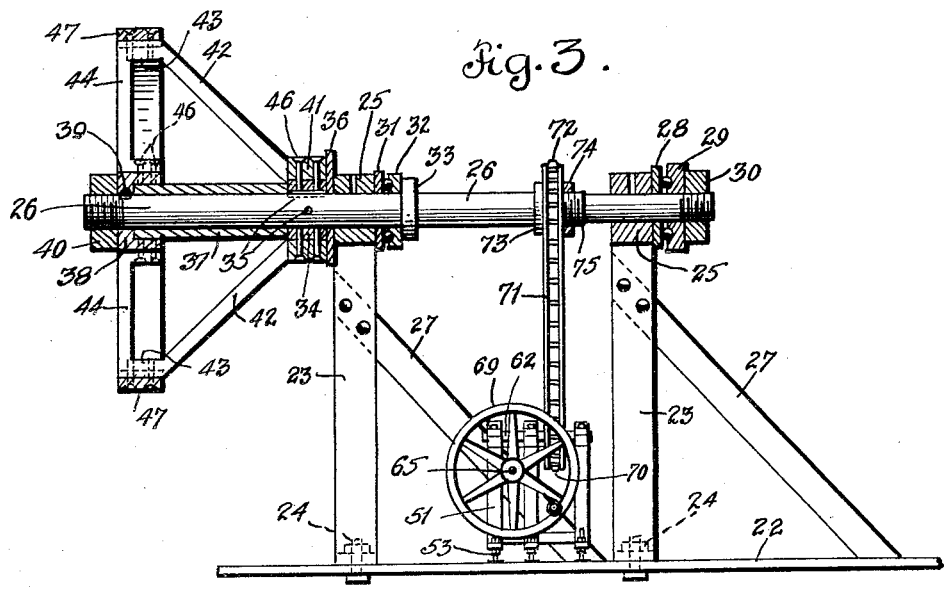
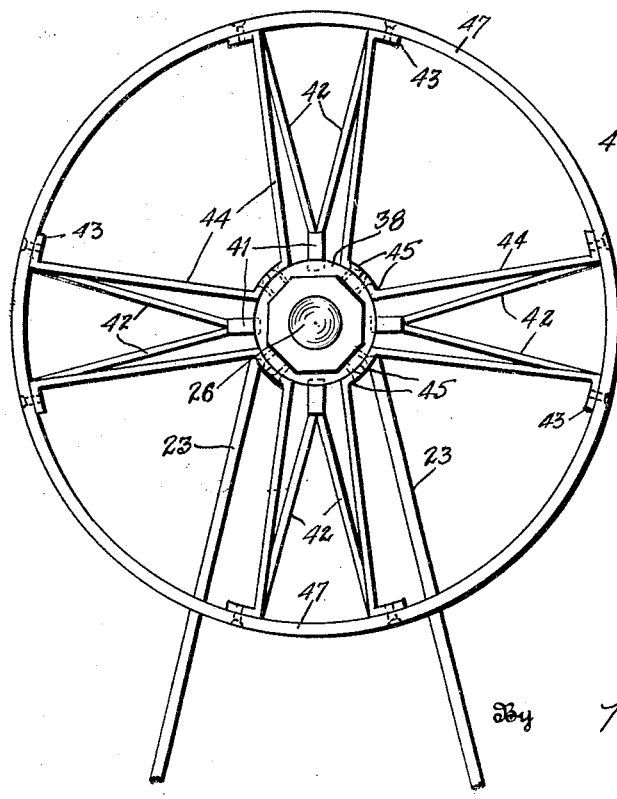
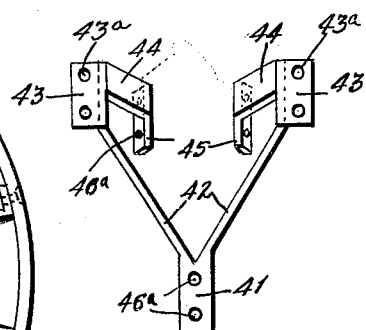
Inventor
Louis Balga.
By Bryant & Lowry
Attorneys Jan. 17, 1933.  L. BALGA  1,894,844
AIRCRAFT PROPULSION MECHANISM
Filed Nov. 27, 1931   3 Sheets-Sheet 3
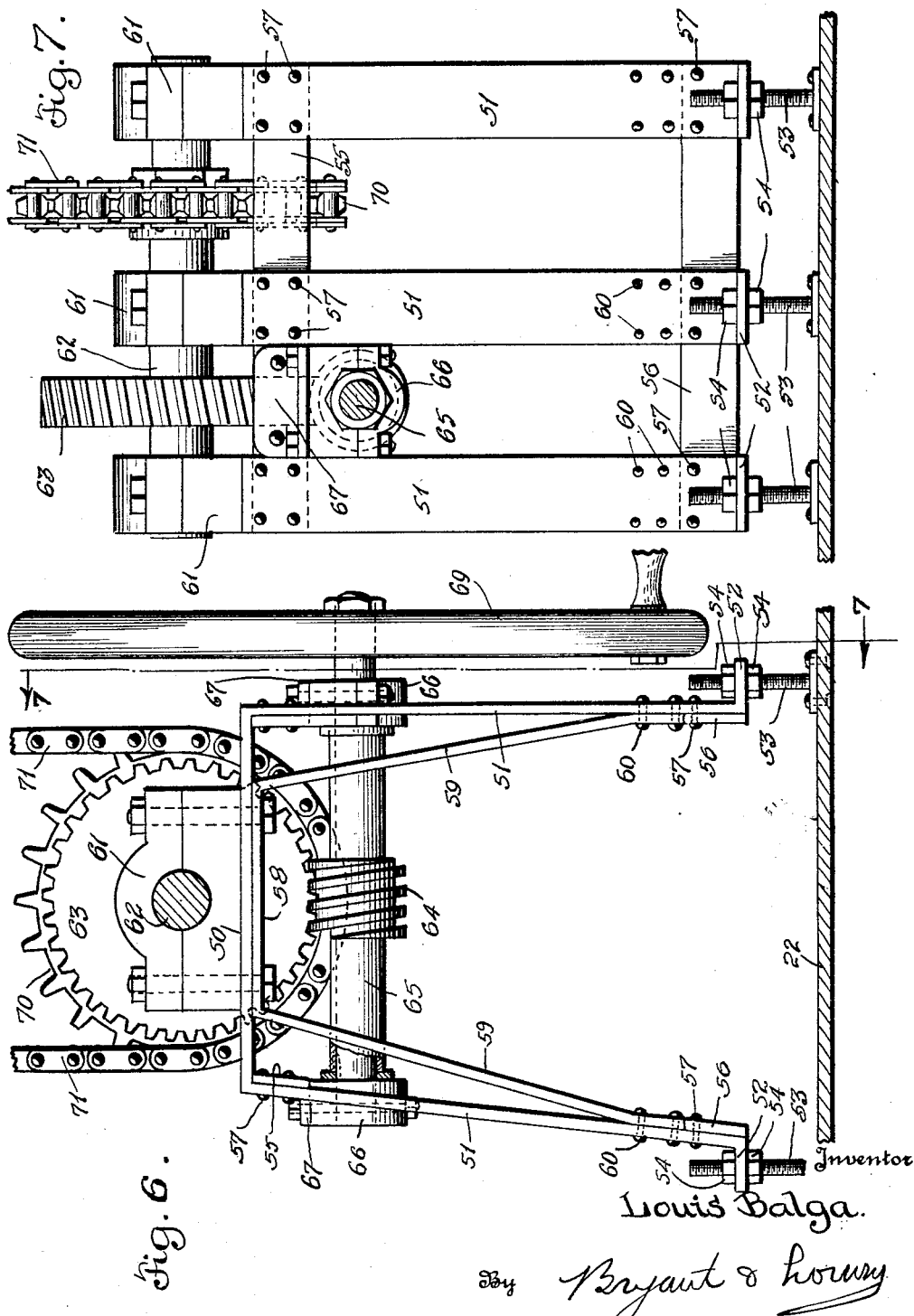

Patented Jan. 17, 1933

1,894,844

UNITED STATES PATENT OFFICE

LOUIS BALGA, OF BRIDGEPORT, CONNECTICUT

AIRCRAFT PROPULSION MECHANISM

Application filed November 27, 1931. Serial No. 577,674.

This invention relates to certain new and useful improvements in Aircraft propulsion mechanism.

The primary object of the invention is to provide aircraft propulsion mechanism embodying a plurality of independently operable motor operated propellers preferably arranged in circular series with supporting devices therefor adapted to be manually shifted whereby the propellers and driving motors therefor may be shifted when one or more of the propellers become damaged or fail to operate so that the propulsion means may be properly located relative to the aircraft for maintaining equilibrium thereof and proper distribution of the propulsion mechanism for the proper flight of the aircraft.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an airplane equipped with the improved propulsion mechanism;

Figure 2 is a front elevational view showing the propulsion mechanism as comprised of a circular series of four independent motor operated propellers;

Figure 3 is a vertical longitudinal sectional view of the supporting structure for the propulsion mechanism removed from the fuselage of the airplane and illustrating the manually operable devices for imparting shifting movement to the propulsion mechanism;

Figure 4 is an enlarged front elevational view of the circular frame structure for supporting the motor operated propeller;

Figure 5 is a perspective view of one of the supporting arms showing V-legs to accommodate the mounting of a motor;

Figure 6 is an enlarged end elevational view, partly in section showing a part of the manually operable devices for shifting the motor operated propellers;

Figure 7 is a vertical longitudinal sectional view taken on line 7—7 of Figure 6;

Figure 8 is a diagrammatic view showing the ring of the supporting structure carrying four propellers with one propeller broken and the remaining three propellers properly positioned to maintain equilibrium of the airplane;

Figure 9 is a diagrammatic view showing four propellers with two broken and illustrating by dotted lines the propellers in shifted positions whereby the two operating propellers maintain equilibrium of the airplane;

Figure 10 is a diagrammatic view showing four propellers in which two are broken with shifting movement unnecessary;

Figure 11 is a diagrammatic view showing four propellers with three broken with the remaining operating propeller properly positioned;

Figure 12 is a diagrammatic view showing three propellers;

Figure 13 is a diagrammatic view showing three propellers with one broken and the remaining two properly disposed;

Figure 14 shows three propellers with two broken;

Figure 15 is a diagrammatic view showing two propellers; and

Figure 16 is a diagrammatic view, similar to Figure 15 showing one propeller broken and the device shifted for properly positioning the remaining operating propeller.

Referring more in detail to the accompanying drawings, the reference character 20 designates the fuselage of an airplane equipped with the usual landing gear and devices appurtenant to the empennage, the reference numeral 21 designating the wing herein illustrated as being located adjacent the upper side of the fuselage.

The supporting structure for the propulsion mechanism as shown in Figure 3 is mounted upon a platform 22 within the fuselage adjacent the forward end with supporting legs 23 secured at their lower ends as at 24 to the platform, the supporting legs being arranged in pairs and each carrying a shaft bearing 25 at its upper end for the rotatable support of a horizontal shaft 26. The legs 23 are further strengthened by angle braces 27 extending from the upper ends of the legs to the platform 22. The supporting legs 23 extend above the fuselage 20 as shown in Figure 1 and the mounting of the shaft 26 in the bearing 25 at the upper ends of the legs includes a wear plate 28 surrounding the shaft and engaged with the outer side of the rear bearing, a ball bearing race 29 being associated with the wear plate 28 and retained upon the rear end of the shaft 26 by the nut 30 threaded upon the shaft as illustrated in Figure 3. A wear plate 31 is mounted upon the shaft 26 and is engaged with the rear side of the forward bearing 25, said plate 31 being engaged by a ball bearing race 32 that is retained in position relative to the wear plate and associated bearing 25 by the integral collar 33 of the shaft 26, the collar 33 acting to prevent rear thrust movement of the shaft 26.

A plurality of motor operated propellers is mounted upon the forward projecting end of the shaft 26, a support for the independent propellers and motors including a collar 34 doubly keyed as at 35 upon the shaft 26 adjacent the forward side of the front bearing 25 with a wear plate 36 interposed between the collar 34 and adjacent bearing 35. The forward end of the shaft 26 forwardly of the collar 34 is enclosed by a sleeve 37 terminating rearwardly of the forward end of said shaft with the rear end of the sleeve engaged with the collar 34 and the forward end of the sleeve engaged by a collar 38 keyed to the shaft as at 39 with the rear portion thereof overlying or enclosing the forward end of the sleeve 37, the jamb nut 40 threaded upon the forward terminal end of the shaft 26 maintaining the parts in assembled relation as illustrated in Figure 3.

As shown in Figures 3 to 5, a plurality of frame members, one of which is illustrated in detail in Figure 5 is fixed to the collars 34 and 38, each frame member including a block 41 carrying a pair of forwardly and outwardly divergent arms 42 with a block 43 at the outer end of each arm that carries an inwardly converging arm 44 provided upon its inner end with an angularly directed foot 45. The block 41 is engaged with the collar 34 and the foot 45 is engaged with the collar 38, the foot and block being anchored to the respective collars by rivets 46 or other fastening devices, the block 41 and foot 45 having openings 46a therein to accommodate the passage of the fastening devices. The outer blocks 43 are enclosed by a ring or band 47 anchored in position thereon by fastening devices passing through openings 43a in the blocks 43. The arms 44 diverging outwardly from the collar 38 provide areas therebetween adjacent the band 47 for the support of motors 48, each being independently operable and carrying a propeller blade 49 as shown in Figures 1 and 2. The number of frame members supported upon the collars 34 and 38 determines the number of independently operating motor propellers, Figures 8 to 16 showing groups of 2, 3 and 4 propellers and as the object of the invention is to position the operating propellers when one or more of a group of propellers fail to operate, devices are provided for rotating the shaft 26 in either direction and such devices are shown more clearly in Figures 1, 3, 6 and 7. A frame structure is supported upon the platform 22 beneath the shafts 26 and includes a series of spaced inverted U-shaped frame bars comprising cross-heads 50 with depending side legs 51 with angle feet 52 at their lower ends received on jack screws 53 rising from the platform 22 with jamb nuts 54 threaded on the jack screws above and below the feet 52 for vertically adjusting the frame bars. The frame bars are retained in spaced relation and constitute a unitary construction by the upper and lower horizontal connecting bars 55 and 56 respectively secured to the side legs 51 as at 57. An inner brace frame is provided for each inverted U-frame bar and includes an upper head 58 with divergent depending side legs 59 secured as at 60 to the side legs 51 adjacent their lower ends and above the cross-connecting bars 56.

A bearing block 61 is mounted upon the upper end of each frame bar and rotatably supports a shaft 62, said shaft carrying a worm wheel 63 that meshes with a worm 64 disposed therebeneath and carried by a shaft 65 journalled in end bearings 66 supported on hanger brackets 67 secured to the spaced upper cross bars 55 between corresponding pairs of adjacent frame legs 51. A hand wheel 69 is fixed to a projecting end of the shaft 65 for operating the worm and worm wheel to impart rotary movement to the shaft 62.

A sprocket wheel 70 is fixed to the shaft 62 and has a sprocket chain connection 71 with a sprocket wheel 72 fixed upon the shaft 26, one side of the sprocket wheel 72 being engaged by the integral collar 73 formed on the shaft 26 while the other side of the sprocket wheel 72 is engaged by the jamb nut 74 working on the threaded portion 75 of the shaft 26. The jack screws 53 may be operated to take up slack in the sprocket chain 21.

From the above detailed description of the invention, it is believed that the construction and operation thereof will at once be apparent, attention now being directed to Figures 8 to 16, Figures 8 to 11, showing a plurality of four propellers, one of the propellers in Figure 8 being broken and the other three operating propellers so positioned as to maintain proper equilibrium of the aircraft and an even pull of the propelling mechanism for the aircraft. In Figure 9, two of the four propellers are broken as indicated by full lines and the shaft 26 rotated by means of the operating mechanism supported upon the platform 22 for causing the operating propellers to be shifted to the dotted line positions for even distribution of the pulling force thereof. Figure 10 shows two propellers broken and the operating propellers properly positioned for correct propulsion, while in Figure 11, three propellers are broken and the single remaining operating propeller is properly positioned. Figures 12 to 14 show three propellers, one of the propellers in Figure 13 being broken and the two operating propellers properly positioned, while in Figure 14 two of the propellers are broken and the single remaining operating propeller in proper position. Figures 15 and 16 show a pair of propellers, one of the propellers in Figure 16 being broken as illustrated by dotted lines, the shifted position of the operating propellers being indicated by full lines. It is therefore possible to equip aircraft with a plurality of propulsion devices such as independently operated propellers with mechanism for shifting the propellers to maintain the proper equilibrium of the aircraft should one or more of the propellers become broken.

While there are herein shown and described the preferred embodiments of the invention, it is nevertheless to be understood that minor changes may be made therein without departing from the spirit and scope of the invention as claimed.

I claim:—

1. Airplane propulsion mechanism comprising a plurality of independently operable motor operated propellers, and means for bodily shifting the propellers in a circular path perpendicular to the longitudinal axis of the airplane.

2. Airplane propulsion mechanism comprising a perpendicular circular series of independently operable motor operated propellers, and means for shifting the propellers relative to the airplane.

3. Airplane propulsion mechanism comprising a perpendicular circular series of independently operable motor operated propellers, a perpendicularly positioned journalled frame supporting the propellers, and means for rotating the frame to re-position the operative propellers when any of the propellers are out of use.

4. Airplane propulsion mechanism comprising a perpendicular circular series of independently operable motor operated propellers, means for shifting the propellers relative to the airplane, including a horizontally journalled shaft supporting the propellers, and operating means for the shaft.

5. Airplane propulsion mechanism comprising a perpendicularly positioned circular series of independently operable motor operated propellers, a journalled frame supporting the propellers, means for rotating the frame to re-position the operative propellers to effect even draft of the propellers relative to the airplane when any of the propellers are out of use, including a horizontally journalled shaft supporting the propellers, and operating means for the shaft.

6. Airplane propulsion mechanism comprising a plurality of independently operable motor operated propellers, means for shifting the propellers relative to the airplane, including a journalled shaft supporting the propellers, and a second manually rotatable shaft and chain and sprocket connections between the two shafts.

7. Airplane propulsion mechanism comprising a circular series of independently operable motor operated propellers, means for shifting the propellers relative to the airplane, including a journalled shaft supporting the propellers, and a second manually rotatable shaft and chain and sprocket connections between the two shafts.

8. Airplane propulsion mechanism comprising a circular series of independently operable motor operated propellers, a journalled frame supporting the propellers, means for rotating the frame to re-position the operative propellers when any of the propellers are out of use, including a journalled shaft supporting the propellers, and a second manually rotatable shaft and chain and sprocket connections between the two shafts.

9. Airplane propulsion mechanism wherein a plurality of motor operated propellers are supported on an airplane in a perpendicular circular series centering on a line parallel with the longitudinal axis of the airplane, a support for the propellers, and manually operable means for shifting the support when some of the propellers are out of use to position the remaining active propellers at opposite sides of the longitudinal axis of the airplane for restoration of even draft of the propellers relative to the airplane.

10. Airplane propulsion mechanism wherein a plurality of motor operated propellers are supported on an airplane to evenly distribute the draft effect of the propellers relative to the longitudinal axis of the airplane with all of the propellers in operation, a support for the propellers and manually operable means for shifting the support when a propeller is out of use to move the remaining active propellers in a circular path perpendicular to the longitudinal axis of the airplane, to restore even draft of the propellers relative to the airplane.

In testimony whereof I affix my signature.

LOUIS BALGA.